(12) United States Patent
Koh et al.

(10) Patent No.: US 6,208,837 B1
(45) Date of Patent: Mar. 27, 2001

(54) SELECTIVE CALLING/RECEIVING DEVICE

(75) Inventors: Nozomi Koh; Atsuhiko Hashigaya, both of Kanagawa; Hidenori Suzuki, Miyagi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/073,373

(22) Filed: May 5, 1998

(30) Foreign Application Priority Data

May 12, 1997 (JP) .................................................. 9-120541

(51) Int. Cl.[7] ........................................................ H04Q 7/14
(52) U.S. Cl. ........................ 455/31.1; 455/31.2; 455/343; 455/38.3; 370/311; 340/825.44
(58) Field of Search .................................. 455/343, 31.1, 455/38.3, 31.2; 340/825.44; 370/311

(56) References Cited

U.S. PATENT DOCUMENTS

| 5,448,774 | * | 9/1995 | Yokozaki et al. | 455/343 |
| 5,765,104 | * | 6/1998 | Kushita | 455/343 |
| 5,778,311 | * | 7/1998 | Nakanishi | 455/343 |
| 5,857,146 | * | 1/1999 | Kido | 455/38.3 |
| 5,953,646 | * | 9/1999 | Hirasawa | 455/343 |

FOREIGN PATENT DOCUMENTS

| 5-103024 | 4/1993 | (JP) . |
| 5-347522 | 12/1993 | (JP) . |
| 7-326998 | 12/1995 | (JP) . |

* cited by examiner

Primary Examiner—Daniel S. Hunter
Assistant Examiner—Alan T. Gantt
(74) Attorney, Agent, or Firm—Pearne & Gordon LLP

(57) ABSTRACT

The result of detection performed by a receiving electric-field level detection circuit 8 and the result of detection performed by an automatic gain setting circuit 9 are fed back to a timing signal generation circuit 10 which controls a pre-heat time of a selective calling/receiving device. As a result, the pre-heat time can be changed according to the state of propagation of radio waves, and hence the life of battery of the calling/receiving device can be increased.

5 Claims, 5 Drawing Sheets

SELECTIVE CALLING/RECEIVING DEVICE

BACKGROUND OF THE INVENTION

The present invention relates to a selective calling/receiving device which is equipped with a compact battery and intermittently performs a receiving operation through use of a timing signal generation circuit.

FIGS. 4A and 4B are schematic representations for explaining receiving timing of an existing selective calling/receiving device. In FIGS. 4A and 4B, the duration of a data segment to be received by the selective calling/receiving device is as short as 1.875 sec. for example, and the data segments to be received are transmitted at long intervals, for example, every 30 sec. For these reasons, the selective calling/receiving device intermittently performs a receiving operation in order to receive only the required data segments, thereby increasing the life of a battery. In order to cause the selective calling/receiving device to intermittently perform a receiving operation in the manner as mentioned previously, it is necessary to determine the control timing of intermittent receiving operations, in consideration of a period of time (i.e., pre-heat time) during which the device becomes possible to receive a data segment after having received power from the power source. Generally, a receiver requires a longer pre-heat time when a receiving electric-field strength is weak, and the timing of intermittent operation of the receiver is controlled such that the receiver starts up under the worst conditions.

Referring to FIG. 5, the configuration and operation of an existing selective calling/receiving device will be described. A high-frequency signal converted into an electrical signal by means of an antenna 1 is amplified by a high-frequency amplifying circuit 2, where the amplified signal is output to a frequency conversion circuit 3. An electric field level detection circuit 8 determines the level of the signal output from the frequency conversion circuit 3 and outputs the result of such determination to an automatic gain setting circuit 9 which sets the gain of the high-frequency amplifying circuit 2. The calling characteristics of the calling/receiving device in a strong electric field are made stable by feeding back the result of such setting to the high-frequency amplifying circuit 2. The output from the frequency conversion circuit 3 is demodulated by a demodulation circuit 4, where transmission data are demodulated. The internal timing of the calling/receiving device is synchronized to the timing of transmission data by means of a synchronization circuit 5, using the demodulated data received from the demodulation circuit 4. A timing signal generation circuit 10 determines the timing of intermittent operation of the calling/receiving device, using the internal timing synchronized to the transmission data. A comparison circuit 6 compares a received selective call number with the selective call number of the calling/receiving device. If there is a match between the numbers, a notification circuit 7 notifies the user of an incoming call, using sound, vibration, or an indication. The timing signal generation circuit 10 determines the timing of intermittent operation of the calling/receiving device from the result received from the synchronization circuit 5, and the pre-heat time of the calling/receiving device is determined in such a way that the receiver starts up under the most undesirable conditions of electric field, e.g., in a weak electric field.

As mentioned previously, since the pre-heat time of the existing selective calling/receiving device for use with a mobile communications terminal is set so as to start up under the most undesirable conditions, the setting of the calling/receiving device is undesirable in terms of the life of the battery.

SUMMARY OF THE INVENTION

The present invention has been contrived to solve the foregoing drawback in the existing selective calling/receiving device, and the object of the present invention is to provide a selective calling/receiving device for use with a mobile communications terminal which enables an increase in the life of the battery by averagely reducing the pre-heat time.

To this end, according to the present invention, the pre-heat time of a selective calling/receiving device is variably controlled according to the state of propagation of radio waves, by feeding back the result of detection made by a receiving electric-field level detection circuit and the result of setting made by an automatic gain setting circuit to a timing signal generation circuit which controls the pre-heat time of the device, thereby increasing the life of the battery of the calling/receiving device.

DETAILED DESCRIPTION OF THE PREFERRED EMBODIMENTS

Figure 1:
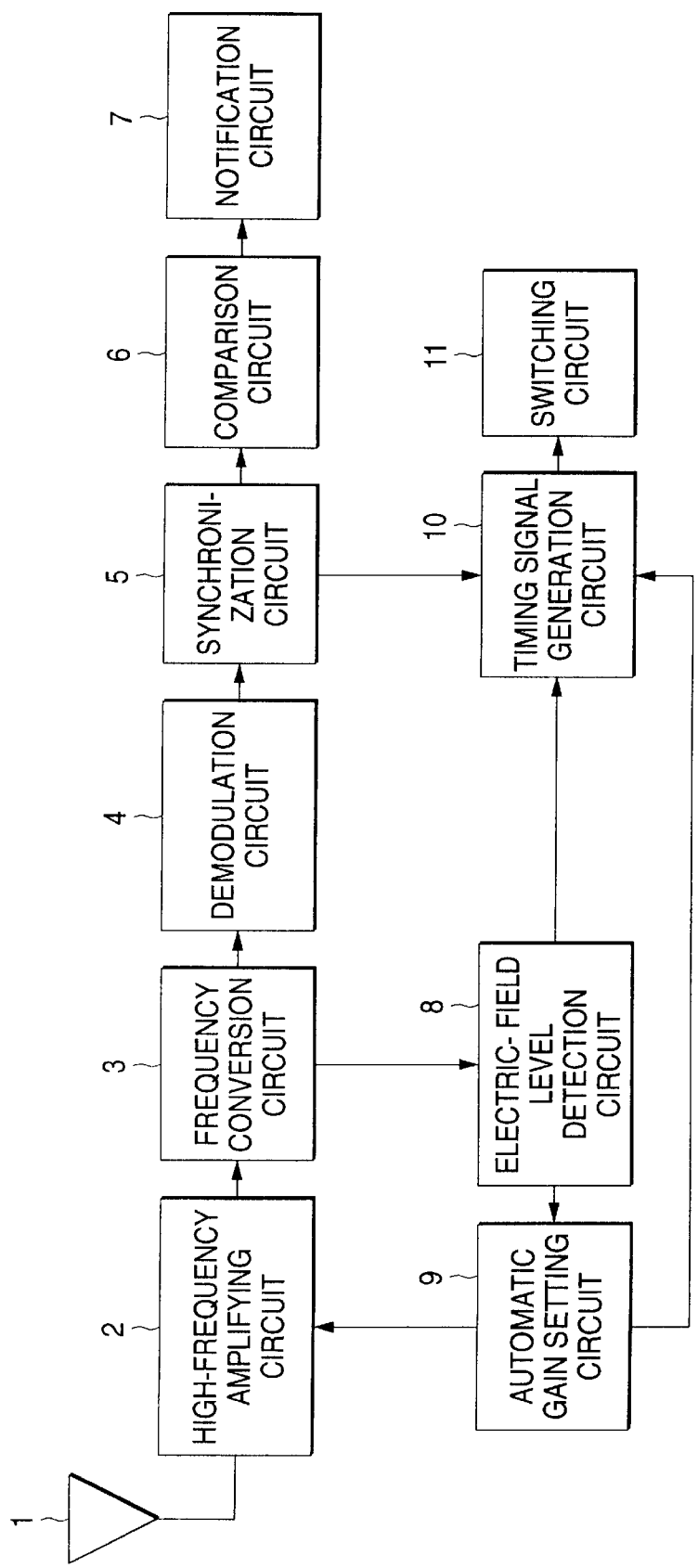
FIG. 1 is a block diagram schematically showing the configuration of a selective calling/receiving device according to a first embodiment of the present invention.

The invention as defined in aspect 1 is directed to a selective calling/receiving device, wherein a timing signal generation circuit determines the control timing of intermittent receiving operations while ensuring a pre-heat time to render the device active by application of power to the device prior to a signal to be received, the improvement being characterized by the feature that the timing signal generation circuit variably controls the pre-heat time so as to correspond to a receiving electric-field level detected by a receiving electric-field level detection circuit. As a result, there is yielded an advantage of being able to increase the life of the battery by decreasing an unnecessary pre-heat time when the device is in a strong electric field.

In view of the invention as defined in aspect 1, the invention as defined in aspect 2 is further characterized by the feature that the timing signal generation circuit variably controls the pre-heat time according to the gain set by an automatic gain setting circuit of a high-frequency amplifying circuit. As a result, there is yielded an advantage of being able to increase the life of the battery by decreasing an unnecessary pre-heat time when the device is in a strong electric field and achieves high gain.

In view of the invention as defined in aspect 1, the invention as defined in aspect 3 is further characterized by the feature that the timing signal generation circuit variably controls the pre-heat time according to a detected receiving electric-field level and the amount of gain limited by an automatic gain setting circuit which sets the gain of a high-frequency amplifying circuit. As a result, there is yielded an advantage of being able to increase the life of the battery by decreasing an unnecessary pre-heat time when the device is in a strong electric field and achieves high gain.

In view of the invention as defined in any one of aspects 1 through 3, the invention as defined in aspect 4 is characterized by further comprising an error rate detection circuit for detecting a bit error rate of received and demodulated data, wherein the amount of gain limited by the automatic gain setting circuit is determined according to the thus-detected bit error rate. As a result, there is yielded an advantage of being able to increase the life of the battery by decreasing both an unnecessary pre-heat time when the device is in a strong electric field and achieves high gain and unnecessary gain control operations when the bit error rate is small.

(First Embodiment)

Figure 4A:
FIGS. 4A and 4B are timing charts showing the receiving timing of an existing selective calling/receiving device.
Figure 4B:
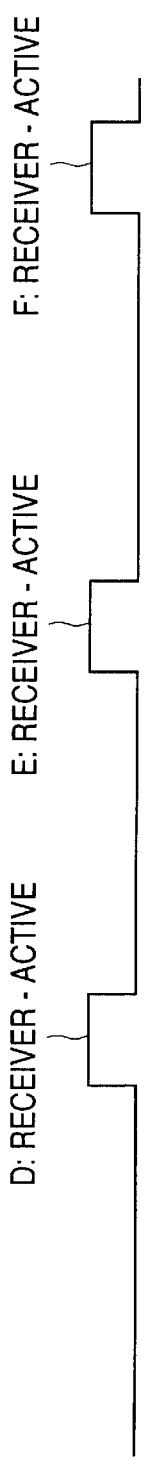
Figure 5:
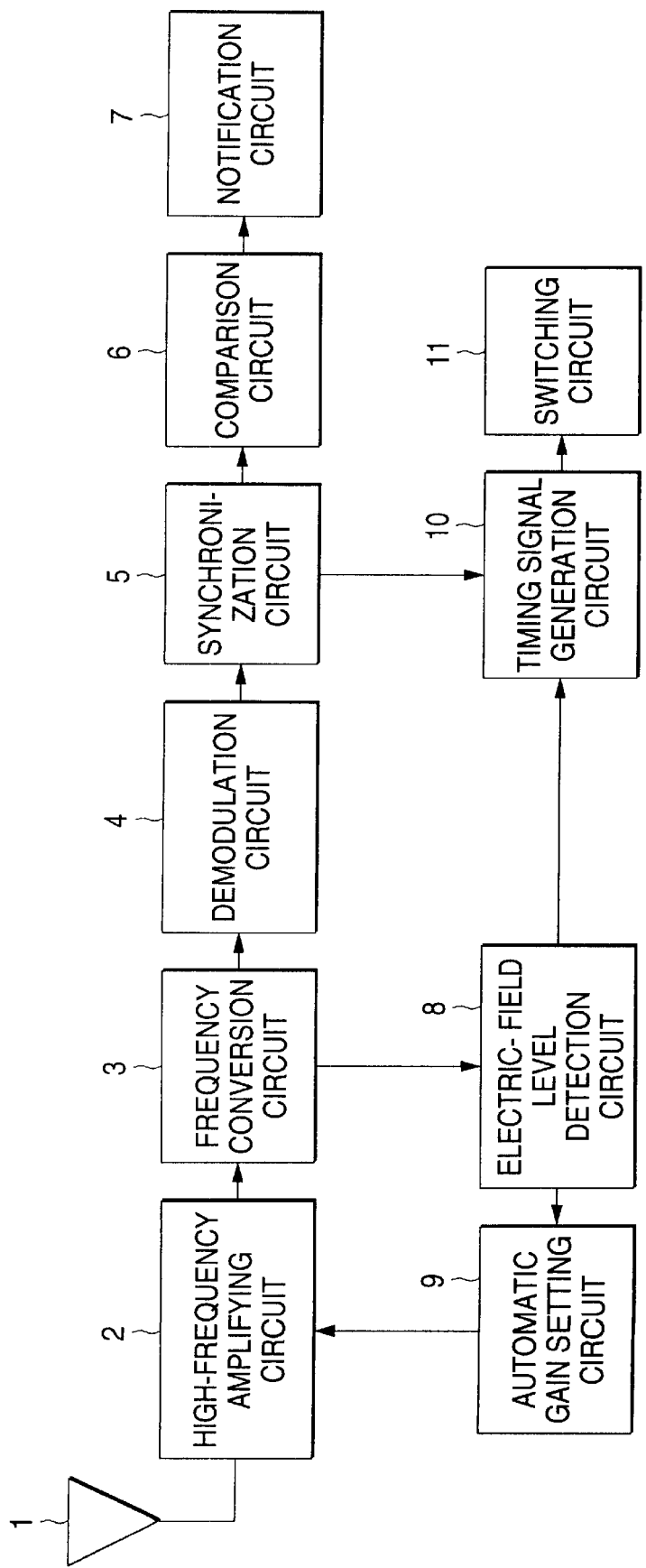
FIG. 5 is a block diagram schematically showing the configuration of the existing selective calling/receiving device.

FIG. 1 schematically shows the configuration of a selective calling/receiving device according to a first embodiment of the present invention. For convenience of explanation, the same reference numerals are used to designate the constituent elements which are the same as those used for the existing example shown in FIG. 4. Reference numeral 1 designates an antenna; 2 designates a high-frequency amplifying circuit which amplifies a high-frequency signal received by the antenna 1; 3 designates a frequency conversion circuit which converts the received high-frequency signal into a base band signal; 4 designates a demodulation circuit which demodulates received data; 5 designates a synchronization circuit which synchronizes the internal timing of the calling/receiving device to the timing of intermittently-transmitted data; 6 designates a comparison circuit which compares a transmitted selective call number with a selective call number of the calling/receiving device; 7 designates a notification circuit which notifies the use of an incoming call by means of sound or vibration when there is a match between the numbers; 8 designates an electric-field level detection circuit which detects a receiving electric-field level from an output from the frequency conversion circuit 3; 9 designates an automatic gain setting circuit which sets the gain of the high-frequency amplifying circuit 2 according to the detected electric-field level; 10 designates a timing generation circuit which generates a timing signal used for intermittent receiving operation of the calling/receiving device from the electric-field level detected by the electric-field level detection circuit 8, the amount of limitation of gain set by the automatic gain setting circuit 9, and a synchronization signal received from the synchronization circuit 5; and 11 designates a switching circuit which controls turning on-and-off operations of the power supply of the calling/receiving device on the basis of the thus-produced timing signal.

The operation of the selective calling/receiving device according to the first embodiment will now be described. Since the overall operations of the calling/receiving device are substantially the same as those of the existing selective calling/receiving device, an explanation will be given of only a difference between the calling/receiving device according to the first embodiment and the existing calling/receiving device. A receiver generally features slow wake-up when there is a low receiving level and quick wake-up when there is a high receiving electric-field level. Because of these features, a pre-heat time required by the receiver to perform intermittent receiving operations is changed depending on a receiving electric-field level. First, the current receiving electric-field level is detected through use of the electric-field level detection circuit 8. An output from the electric-field level detection circuit 8 is output to the timing signal generation circuit 10 that controls the pre-heat time of the receiver. Depending on the electric-field level output from the electric-field level detection circuit 8, the timing signal generation circuit 10 determines the pre-heat time required by the receiver to perform the next intermittent receiving operation and controls the intermittent receiving operations via the switching circuit 11.

The output from electric-field level detection circuit 8 is also output to the automatic gain setting circuit 9 with a view toward stabilizing the characteristics of the receiver when the receiver receives a signal at a strong electric-field level. For the receiver, commencing of the next intermittent receiving operations while the gain of the receiver is reduced by means of the automatic gain setting circuit 9 equals to the receipt of a signal at a reduced receiving electric-field level, and hence it is necessary to set the next pre-heat time in consideration of the reduction in receiving electric-field level. Consequently, it is possible to finely control the pre-heat time according to the state of the receiving electric-field and the state of the automatic gain setting circuit 9 by outputting a signal regarding the state of the automatic gain setting circuit 9 to the timing signal generation circuit 10. As a result, the proportion of receiving time of the receiver during the intermittent receiving operations are performed can be reduced, enabling an increase in the life of the battery.

Figure 2A:
FIGS. 2A to 2C are timing charts showing intermittent receiving operations of the selective calling/receiving device according to the first embodiment.
Figure 2B:
Figure 2C:

Next, the operation of the foregoing selective calling/receiving device will be described by reference to timing charts shown in FIGS. 2A to 2C. FIG. 2A shows a stream of transmission data. Hatched portions of the stream represent data sets to be received by the receiver. The receiver which performs intermittent receiving operations is controlled by the synchronization circuit 5 and the timing signal generation circuit 10 housed in the receiver so as to perform receiving operations only when there are incoming data sets to be received. FIG. 2B shows one example of an intermittent receiving operation control signal. When the signal is in a high state, the receiver performs a receiving operation. In contrast, when the signal is in a low state, the receiver becomes inactive. Of the duration of each high signal in which the receiver performs a receiving operation through use of the intermittent receiving operation control signal shown in FIG. 2B, a portion of the high signal preceding to the hatched portion of the stream of data corresponds to a pre-heat time. FIG. 2C shows another example of the intermittent operation control signal. In such a case, since the electric-field detected in the hatched receiving period (a-1) is greater than a certain threshold level, the pre-heat time for the next receiving period (a-2) is reduced when compared with the pre-heat time required by the previous operation. As mentioned previously, the pre-heat time corresponding to the electric-field level may be changed before and after a certain threshold value, or the pre-heat time may be continually changed with respect to the electric-field level.

(Second Embodiment)

Figure 3:
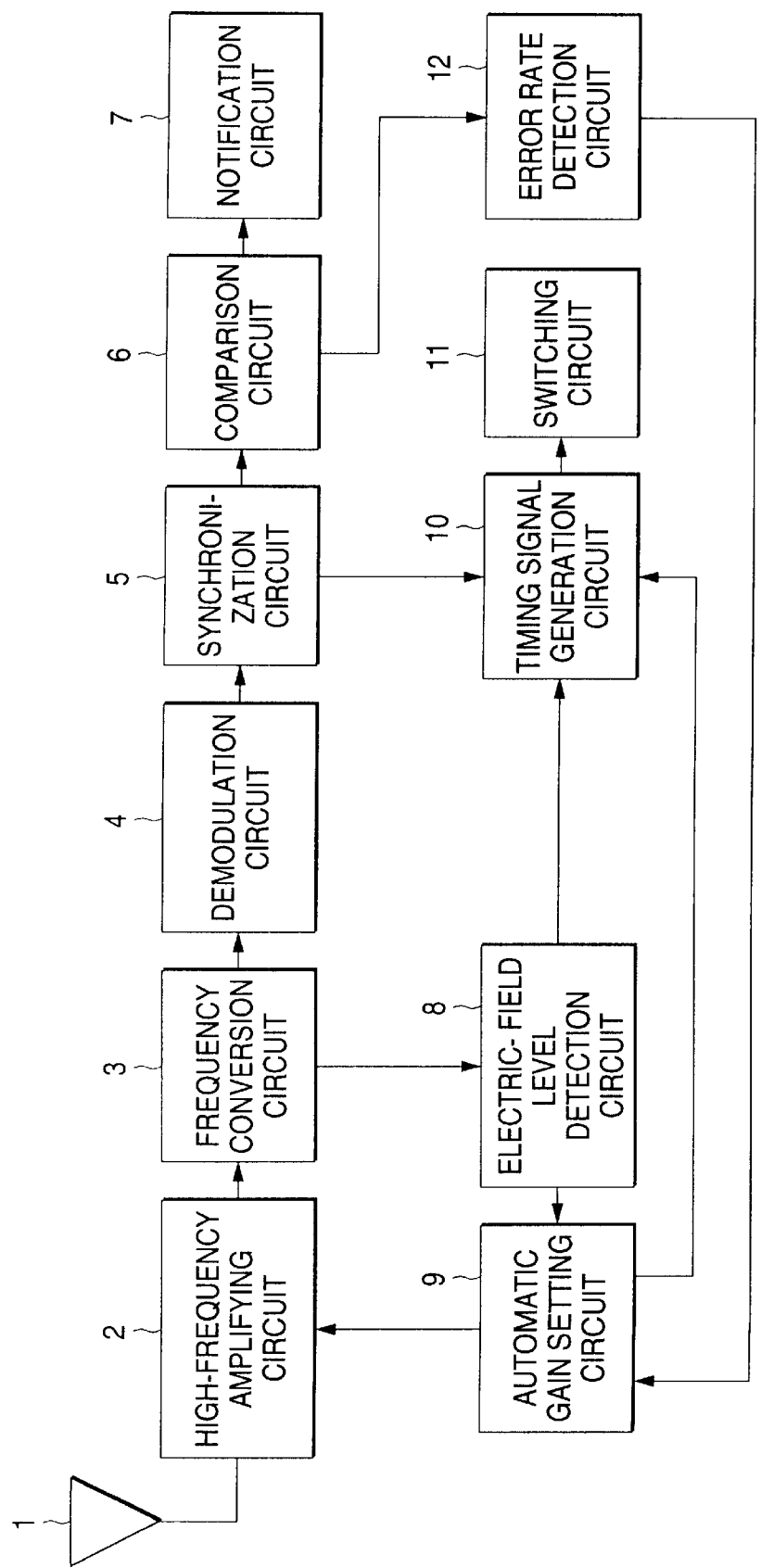
FIG. 3 is a block diagram schematically showing the configuration of a selective calling/receiving device according to a second embodiment of the present invention.

FIG. 3 schematically shows the configuration of a selective calling/receiving device according to a second embodiment of the present invention. The same reference numerals are assigned to the elements which are the same as those shown in FIG. 1, and their overlapping explanations will be omitted for brevity. An explanation will be given solely of the difference between the first and second embodiments.

The second embodiment is different from the first embodiment in that the device according to the second embodiment is provided with an error rate detection circuit 12 for detecting a bit error rate of a demodulated signal and that the result of detection made by the error rate detection circuit is fed back to the automatic gain setting circuit 9. Even when the receiver receives a signal at a strong electric-field level, so long as the quality of the received signal is superior, there is no need to activate the automatic gain setting circuit 9. So long as the unnecessary gain control is eliminated, the pre-heat time can be decreased further. By feeding back the result of the error rate detection circuit 12 to the automatic gain setting circuit 9, the state of the automatic gain setting circuit 9 can be controlled according to the state of the receiving electric-field level and the quality of the receiving signal, enabling elimination of unnecessary operations of the automatic gain setting circuit 9. Further, so long as the result of such detection is output to the timing signal generation circuit 10, the pre-heat time required for intermittent receiving operations can be controlled according to detailed settings, in consideration of the quality of a receiving signal. Consequently, the proportion of a receiving time during which the receiver performs an intermittent receiving operation can be reduced to a much greater extent.

As is obvious from the foregoing descriptions, the present invention has an advantage of being able to reduce the pre-heat time of a selective calling/receiving device when there is a strong electric field by feeding back the result of detection of a receiving electric-field level detection circuit to a timing signal generation circuit.

Further, according to the present invention, the state of an electric-field in a receiving area is forecast on the basis of the error rate of a received signal detected by an error rate detection circuit to thereby eliminate unnecessary gain control operations, rendering the receiver easy to start up. As a result, there is yielded an advantage of being able to reduce the pre-heat time further, as well as to increase the life of the battery.

What is claimed is:

1. A selective calling/receiving device comprising:
    a timing signal generation circuit for determining the control timing of intermittent receiving operations while ensuring a pre-heat time to render the device active by application of power to the device prior to a signal to be received, and
    a receiving electric-field level detection circuit for detecting a receiving electric-field level,
    wherein the timing signal generation circuit variably controls the pre-heat time so as to correspond to the receiving electric-field level detected by the receiving electric-field level detection circuit.

2. The selective calling/receiving device of claim 1, further comprising:
    a high-frequency amplifying circuit, and
    an automatic gain setting circuit for setting a gain of the high frequency amplifying circuit, and
    wherein the timing signal generation circuit variably controls the pre-heat time according to the gain set by the automatic gain setting circuit.

3. The selective calling/receiving device of claim 1, further comprising:
    a high-frequency amplifying circuit, and
    an automatic gain setting circuit for setting a gain of the high frequency amplifying circuit, and
    wherein the timing signal generation circuit variably controls the pre-heat time according to the detected receiving electric-field level and the amount of gain limited by the automatic gain setting circuit.

4. The selective calling/receiving device of claim 1, further comprising:
    an error rate detection circuit for detecting a bit error rate of received and demodulated data, wherein
    the amount of gain limited by the automatic gain setting circuit is determined according to the thus-detected bit error rate.

5. The selective calling/receiving device of claim 1, wherein the timing signal generation circuit decreases the pre-heat time when the detected receiving electric-field level increases.

\* \* \* \* \*